(12) United States Patent
Shtok et al.

(10) Patent No.: US 9,836,673 B2
(45) Date of Patent: Dec. 5, 2017

(54) SYSTEM, METHOD AND COMPUTER PROGRAM PRODUCT FOR TRAINING A THREE DIMENSIONAL OBJECT INDENTIFICATION SYSTEM AND IDENTIFYING THREE DIMENSIONAL OBJECTS USING SEMANTIC SEGMENTS

(71) Applicant: International Business Machines Corporation, Armonk, NY (US)

(72) Inventors: Joseph Shtok, Haifa (IL); Asaf Tzadok, Nesher (IL); Yochay Tzur, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 51 days.

(21) Appl. No.: 14/983,834

(22) Filed: Dec. 30, 2015

(65) Prior Publication Data
US 2017/0193340 A1    Jul. 6, 2017

(51) Int. Cl.
*G06K 9/72* (2006.01)
*G06K 9/62* (2006.01)
(Continued)

(52) U.S. Cl.
CPC ............... *G06K 9/726* (2013.01); *G06K 9/52* (2013.01); *G06K 9/6256* (2013.01); *G06T 7/60* (2013.01); *G06T 2200/04* (2013.01)

(58) Field of Classification Search
CPC ........... G06T 17/00; G06T 2207/20081; G06T 17/10; G06T 7/0046; G06T 7/0032;
(Continued)

(56) References Cited

U.S. PATENT DOCUMENTS 5,388,199 A * 2/1995 Kakazu .............. G05B 19/4097
345/420
6,256,409 B1 * 7/2001 Wang ....................... G06K 9/52
382/170

(Continued)

FOREIGN PATENT DOCUMENTS

JP         EP 1037154 A2 *  9/2000  ............. G06F 17/50

OTHER PUBLICATIONS

Finlayson et al., "Comprehensive Colour Image Normalization", ECCV '98 Proceedings of the 5th European Conference on Computer Vision—vol. I-vol. I, 1998, pp. 1-16.
(Continued)

*Primary Examiner* — Siamak Harandi
*Assistant Examiner* — Carol Wang
(74) *Attorney, Agent, or Firm* — Cantor Colburn LLP; David Quinn

(57) ABSTRACT

A method of training an object identification system and identifying three dimensional objects using semantic segments includes receiving, into a non-volatile memory, an input file containing a geometric description of a three dimensional object having one or more semantic segments and one or more annotations for each of the one or more semantic segments, receiving, into the non-volatile memory one or more training images of the three dimensional object, identifying, through a processor, the one or more segments in the one or more training images, computing, through a training module, one or more descriptors to the one or more segments, and generating an output file representing a machine vision of the three dimensional object.

23 Claims, 4 Drawing Sheets

(51) Int. Cl.
*G06K 9/52* (2006.01)
*G06T 7/60* (2017.01)

(58) Field of Classification Search
CPC .............. G06T 19/00; G06T 19/20; G06T 2219/2021; G06T 2219/004; G06T 7/001; G06T 2207/30164; G06T 15/08; G06T 2200/08; G06K 9/00288; G06K 9/4671; G06K 9/00281; G06K 9/00221; G06K 9/00214; G06K 9/00201; G06F 17/50; G06F 2217/02; G06F 17/30247; G06F 17/30259

See application file for complete search history.

(56) References Cited

U.S. PATENT DOCUMENTS

| | | | |
|---|---|---|---|
| 8,379,014 B2 | 2/2013 | Wiedemann et al. | |
| 8,515,982 B1* | 8/2013 | Hickman | G06F 17/5086 707/758 |
| 2003/0210241 A1* | 11/2003 | Minami | G06T 19/00 345/418 |
| 2006/0045354 A1* | 3/2006 | Hanna | G08B 13/19613 382/224 |
| 2006/0233423 A1* | 10/2006 | Najafi | G06K 9/3208 382/103 |
| 2007/0201743 A1* | 8/2007 | Ferman | G06K 9/4647 382/168 |
| 2009/0096790 A1* | 4/2009 | Wiedemann | G06K 9/00201 345/427 |
| 2010/0231711 A1* | 9/2010 | Taneno | G06K 9/00214 348/135 |
| 2013/0322688 A1* | 12/2013 | Tsuchiya | G08G 1/167 382/103 |
| 2014/0037198 A1* | 2/2014 | Larlus-Larrondo | G06T 7/0081 382/159 |
| 2014/0079314 A1* | 3/2014 | Yakubovich | G06K 9/6254 382/159 |
| 2014/0267614 A1* | 9/2014 | Ding | H04N 13/0275 348/46 |
| 2015/0016712 A1 | 1/2015 | Rhoads et al. | |
| 2015/0186457 A1* | 7/2015 | Enomoto | G06F 17/30424 707/769 |
| 2015/0242686 A1* | 8/2015 | Lenka | G06F 17/3028 382/103 |
| 2015/0293525 A1* | 10/2015 | Yamamoto | G06T 19/20 702/182 |
| 2015/0294181 A1* | 10/2015 | Yamanaka | G06K 9/4671 382/203 |
| 2016/0314341 A1* | 10/2016 | Maranzana | G06F 17/50 |
| 2016/0371539 A1* | 12/2016 | Ming | G06K 9/00268 |

OTHER PUBLICATIONS

Liu et al., "Fast Object Localization and Pose Estimation in Heavy Clutter for Robotic Bin Picking", Mitsubishi Electric Research Laboratories, May 2012, pp. 1-44.
Lowe, David G. "Distinctive Image Features from Scale-Invariant Keypoints", International Journal of Computer Vision, Jan. 5, 2004, vol. 60, Issue 2, pp. 1-28.
Murase et al., "Visual Learning and Recognition of 3-D Objects from Appearance", International Journal of Computer Vision, vol. 14, 1995, pp. 5-24.
Selinger et al., "A Perceptual Grouping Hierarchy for Appearance-Based 3D Object Recognition", Computer Vision and Image Understanding, vol. 76, Issue 1, Oct. 1999, pp. 1-20.

* cited by examiner

SYSTEM, METHOD AND COMPUTER PROGRAM PRODUCT FOR TRAINING A THREE DIMENSIONAL OBJECT INDENTIFICATION SYSTEM AND IDENTIFYING THREE DIMENSIONAL OBJECTS USING SEMANTIC SEGMENTS

BACKGROUND

The present invention relates to the art of machine vision, and more specifically, to a system for training a three dimensional object identification system and identifying three dimensional objects using three dimensional semantic segments.

Machine Vision (MV) describes technology and methods used to provide imaging-based automatic inspection and analysis for a variety of applications. Machine vision employs captured images to identify, inspect, and/or manipulate objects undergoing one or more processes. Imaging devices may be combined with a processing unit or maintained separately. When separated, a connection may be made to specialized intermediate hardware, such as a frame grabber. Many MV applications utilize digital cameras capable of direct connection to an image processor without the need for intermediate hardware.

Many MV systems rely upon two dimensional (2D) imaging processes that employ various light sources. For example, 2D imaging system may employ visible light, infra-red light, line scan imaging, and X-ray imaging. Typically, 2D imaging systems fall into one of two categories monochromatic images, and color images. 2D imaging systems may also detect portions of an object, or to process an entire image. Systems that process an entire image are often times employed in moving or production line processes. Three-dimensional (3D) imaging may also be employed in MV systems. Generally, 3D imaging includes scanning based triangulation, time of flight, grid based, and stereoscopic processes.

Part-based object recognition techniques employ 3D models with semantic points to determine a part center. Such an approach may be time consuming, requiring that the sematic points are manually annotated into the 3D models. Further, this approach does not identify specific regions of a part. Part based object recognition techniques also employ color recognition aide in identification. Colors are sampled at multiple points on an objects surface through pose-annotate training images, a two dimensional projection of the object is generated for each candidate pose, and a pixel-wise template is created. The pixel-wise template is used for matching color and/or texture in a query image. While this approach may be better at identifying specific regions of an object, several drawbacks still exist. Distortions in the pixel-wise template may exist. That is, color at a particular point may vary in each candidate pose due to illumination shortcomings, reflections, and occlusions on the part itself.

SUMMARY

According to an aspect of an exemplary embodiment, a method of training a three dimensional object identification system and identifying three dimensional objects using semantic segments includes receiving, into a non-volatile memory, an input file containing a geometric description of a three dimensional object having one or more semantic segments and one or more annotations for each of the one or more segments, receiving, into the non-volatile memory one or more training images of the three dimensional object, identifying, through a processor, the one or more segments in the one or more training images, assigning, through a training module, one or more descriptors to the one or more segments, and generating an output file representing a machine vision of the three dimensional object.

According to another aspect of an exemplary embodiment, a system includes a central processor unit (CPU), a non-volatile memory operatively connected to the CPU, and a training module configured to analyze an input file containing a geometric description of a three dimensional object having one or more semantic segments, and one or more annotations for each of the one or more semantic segments. The training module includes computer readable program code embodied therewith, the computer readable program code, when executed by the CPU, causes the CPU to: receive, into a non-volatile memory, an input file containing a geometric description of a three dimensional object having one or more semantic segments and one or more annotations for each of the one or more semantic segments, receive, into the non-volatile memory one or more training images of the three dimensional object, identify, through a processor, the one or more segments in the one or more training images, assign, through the training module, one or more descriptors to the one or more segments, and generate an output file representing a machine vision of the three dimensional object.

According to another aspect of an exemplary embodiment, a computer program product for analyzing an input file containing a geometric description of a three dimensional object having one or more semantic segments, and one or more annotations for the one or more semantic segments includes a computer readable storage medium having computer readable program code embodied therewith, the computer readable program code, when executed by a processor, causing the processor to: receive, into a non-volatile memory, the input file containing the geometric description of the three dimensional object having one or more semantic segments and the one or more annotations for each of the one or more semantic segments, receive, into the non-volatile memory one or more training images of the three dimensional object, identify, through a processor, the one or more segments in the one or more training images, assign, through a training module, one or more descriptors to the one or more segments, and generate an output file representing a machine vision of the three dimensional object.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
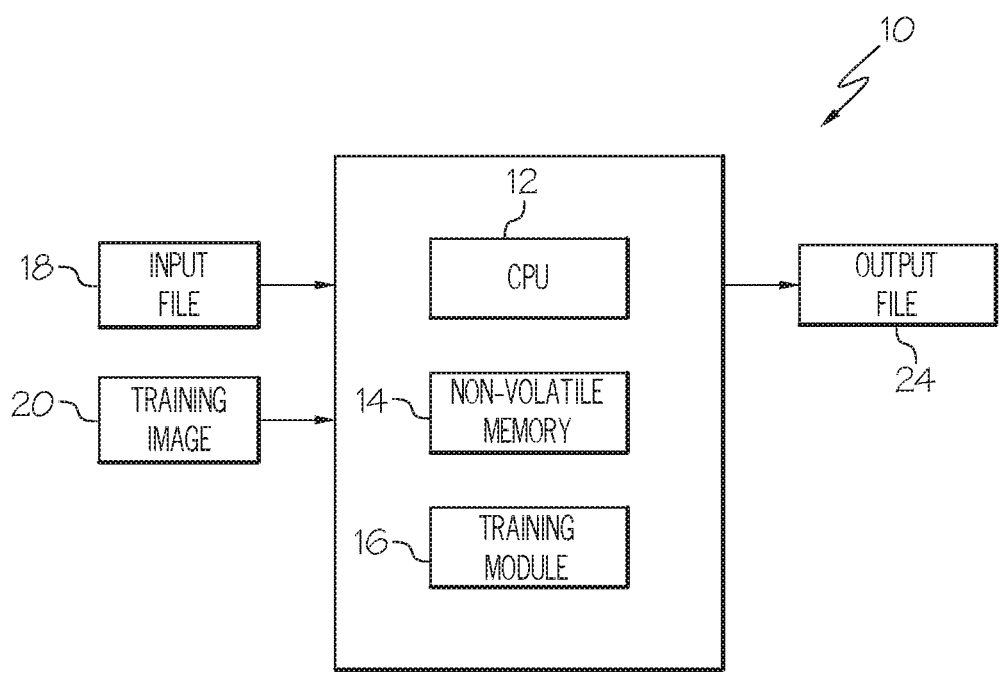
FIG. 1 is a block diagram illustrating a system for identifying three dimensional objects using semantic segments, in accordance with an exemplary embodiment.

With reference now to FIG. 1, a training system for developing an output filed used in identifying objects having three dimensional (3D) segments is generally indicated at 10. Training system 10 includes a central processing unit (CPU) 12 and a non-volatile memory 14. Training system 10 further includes a training module 16. As will be detailed more fully below, training system 10 receives an input file 18 containing a geometric description of a three dimensional (3D) object having a number of semantic or meaningful segments. Input file 18 is stored in non-volatile memory 14 and accessed by training module 16 through CPU 12. The geometric description may be embodied in a computer aided design (CAD) file. Input file 18 also includes annotations for each of the semantic segments. The annotations are manually entered into input file 18 and represent an outline of each of the semantic segments. A training image 20 of the object is captured and input into system 10. Each segment of the training file is analyzed or evaluated, to learn various nuances of the object that may occur in different views. In this manner, training module 16 may generate an output file can be constructed that may be used by a machine to identify the 3D object.

In training, descriptors for each semantic segment are identified by training module 16. The descriptors may take the form of one or more physical characteristics of the segment. The physical characteristics may include color, texture, material characteristics, and/or areas of interest on a segment. For example, an area of interest could register as an area of instability in a captured image. The area of instability may take the form of a decal, a change in the material in a particular segment, the addition of a clear component such as glass, plastic or other such area on a particular segment. During object recognition, known areas of instability may be ignored. Distribution of the segment's descriptor in the different training images may be used to decide how to identify a particular portion of the segment. If the descriptor assumes one of a few well defined shapes or values, the segment can be identified if one of those shapes or values is measured in a query image.

Figure 2:
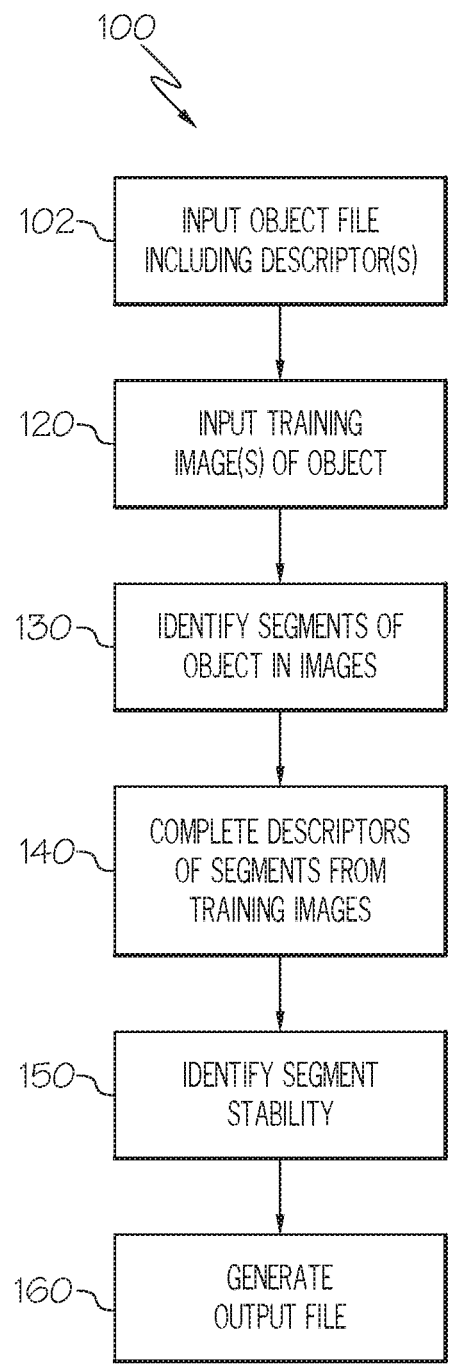
FIG. 2 is a flow chart illustrating a method of training a three dimensional object identification system for identifying three dimensional objects having semantic segments, in accordance with an exemplary embodiment.
Figure 3:
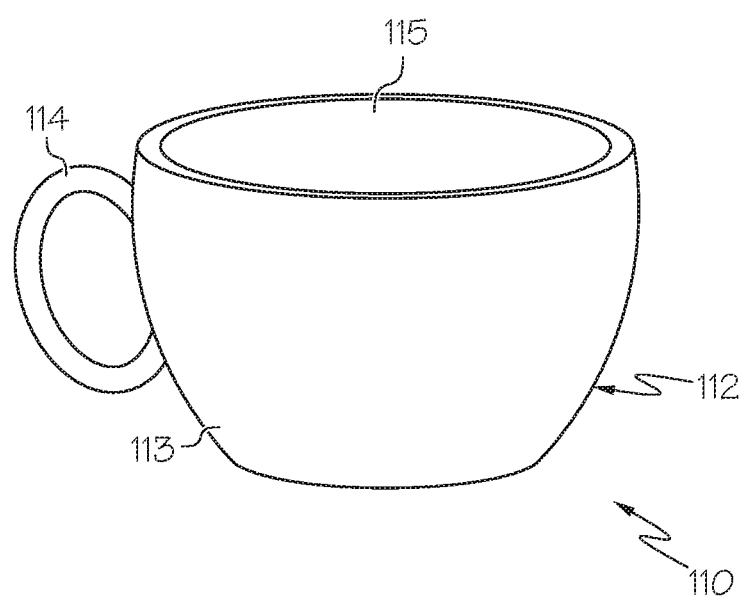
FIG. 3 depicts a three dimensional object having semantic segments being identified, in accordance with an exemplary embodiment.

A method of developing output file 24 of an object having semantic segments is indicated generally at 100 in FIG. 2. In block 102, a file containing 3D object geometry is input into non-volatile memory 14. As noted above, the file includes annotations for one or more semantic segments of the 3D object. For example, a 3D object, indicated generally at 110 in FIG. 3 may take the form of a tea cup 112. Tea cup 112 may include a first meaningful or semantic segment 113, a second semantic segment 114 and a third semantic segment 115. For example, first semantic segment 113 may define an outer surface of tea cup 112; second semantic segment 114 may define a handle for tea cup 112; and third semantic segment 115 may define an inner surface of tea cup 112. The annotations may describe various physical and/or non-physical attributed of each segment 113-115. For example, each descriptor may define one or more of a color, a texture, a material and the like for each segment 113-115.

In block 120, one or more training images are captured of object 110. The one or more training images may represent various poses, angles or the like of object 110. The number of training images taken may vary and may generally depend upon object symmetry, and/or object complexity. The training images may be supplied with object pose annotations. In block 130, training module 16 may identify each semantic segment 113-115 using pose annotations and the segment annotations from training file 18. For example, training module 16 may identify areas in the training image(s) that are associated with each semantic segment 113-115 described in training file 18. At this point, it should be understood, that a pose annotation describes a specification of a 3D object position and orientation in a world coordinate system having six (6) degrees-of-freedom (DOF). Annotation of an object pose in a training image may include (1) intrinsic parameters of a camera such as focal length, sensor specs, lens distortion, and (2) object pose in 3D world coordinates having an origin and orientation that aligns with a sensor plane of the camera.

In block 140, descriptors for each semantic segment 113-115 are computed. A descriptor associated with each semantic segment may describe a specified image region as a vector of numeric values incorporating structural information contained in the image region. Information encoded by the descriptor may represent a specification of the texture, color and/or special features, present in the image region. Examples of area descriptors (which do not depend on specific size and shape of the region) may include a hue-Saturation histogram, and/or a co-occurrence histogram.

In accordance with an aspect of an exemplary embodiment, training module 16 may evaluate an area of each semantic segment to verify each descriptor. In block 150, training module 16 may also identify segment stability. For example, training module 16 may analyze a distribution of descriptors for each semantic segment. Training module 16 may determine whether each semantic segment possesses a single stable, e.g., identifiable, appearance, or whether each semantic segment may include multiple stable appearances. Training module 16 may also determine that a segment does not include a stable appearance.

In accordance with an aspect of an exemplary embodiment, training module 16 may determine that a semantic segment includes a single stable appearance by identifying a well concentrated unimodal distribution of descriptors. In accordance with another aspect of an exemplary embodiment, training module 16 may determine that a semantic segment includes a single stable appearance by identifying a well concentrated multimodal distribution of descriptors. At this point, it should be understood that a unimodal distribution of n-dimensional unit norm descriptor vectors is "well-concentrated" if an associated standard deviation is below $\sigma_{max}$=0.03. It should be further understood that a multi-modal distribution of n-dimensional unit norm descriptor vectors is "well concentrated" if it can be represented as a sum of a number of well concentrated unimodal distributions where pairwise distances between the expectation values of the different modes are all above the threshold of dE=0.2. Determining that a segment does not have a stable appearance, in accordance with an aspect of an exemplary embodiment, may include training module 16 determining that a segment lacks a well concentrated multimodal distribution of descriptors. In block 160, training module 16 forms output file 24.

Figure 4:
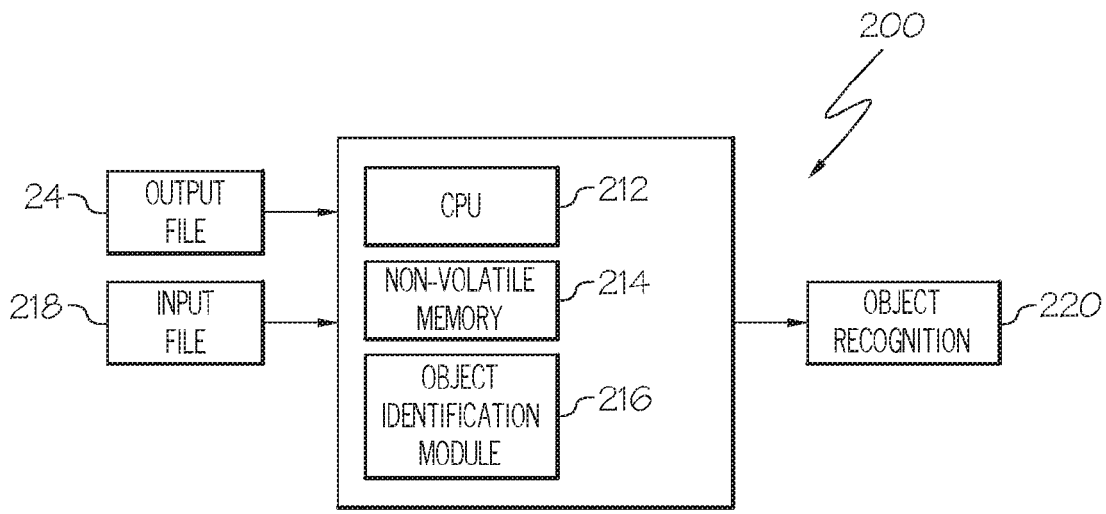
FIG. 4 depicts a system for identifying three dimensional objects having semantic segments, in accordance with an aspect of an exemplary embodiment.

Reference will now follow to FIG. 4 in describing an object recognition system 200 in accordance with an aspect of an exemplary embodiment. Object recognition system 200 includes a central processing unit (CPU) 212 and a non-volatile memory 214. Object recognition system 200 further includes an object recognition module 216. As will be detailed more fully below, object recognition system 200 receives output file 24 as well as captured images 218 of object 110. Output file 24 and captured images 218 are stored in non-volatile memory 214 Object recognition module 216 in conjunction with CPU 212 evaluates the captured images using output file 24 to generate an object identified output 220.

Figure 5:
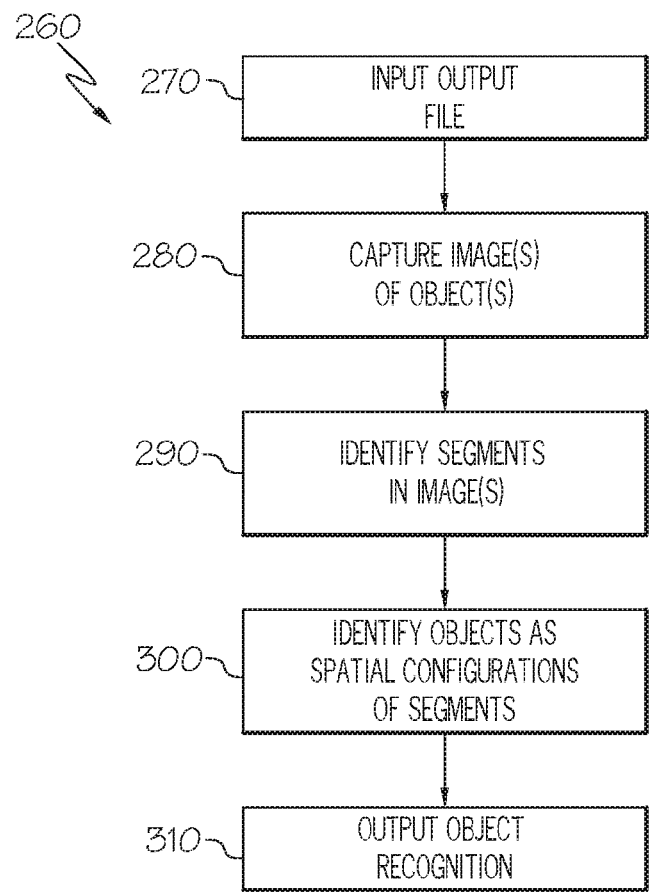
FIG. 5 depicts a flow chart illustrating a method of identifying three dimensional objects with the system of FIG. 4, in accordance with an aspect of an exemplary embodiment.

Reference will now follow to FIG. 5 in describing a method 260 of identifying object 110 using output file 24 generated by method 100 described above. In block 270, output file 24 is input into non-volatile member 214. In block 280, one or more query images 218 are captured of object 110. In block 290, object recognition module 216, through CPU 212, identifies one or more semantic segments in images 218. More specifically, semantic segment descriptors provided in input file 24 are used by object recognition module 216 to evaluate a number of candidates for the segment pose in the image. In block 300, objects are identified as spatial configurations of the semantic segments. The term "spatial configurations" should be understood to mean that objects are identified via recognized associated semantic segments using a Generalized Hough Transform". In accordance with an aspect of an exemplary embodiment, object recognition module 216, in reliance on segment descriptors may be able to identify a segment when only a portion of that segment is observable in a query image. Additionally, the segment descriptor enable object recognition modules 216 to identify a segment in a query image that may not have been captured in a training image. For example, the segment descriptor may identify a surface contour, a color, a texture or that like. Thus, even if a portion of a semantic segment is not captured in a training image, the semantic segment may still be identifiable the query image.

At this point, it should be understood that a training a system employs semantic segments or a 3D object to develop an output file based on one or more capture training images. In the output file, each semantic segment includes annotated descriptors that are later employed in a machine vision system that may employ object recognition to identify the 3D object. By computing descriptors over homogenous or substantially homogenous segments, fewer training images may be required to develop the output file. Further, the exemplary embodiments enable a part recognition system to recognize parts that may be observed only partially when constructing the output file. The output file may then be employed in a process associated with detecting one or more aspects of the 3D object in a query image. For example, the output file may be employed to detect objects passing along an assembly line to identify areas of interest for a process, object quality and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a three dimensional object identification system and identifying three dimensional objects using semantic segments comprising:
   receiving, into a non-volatile memory, an input file containing a geometric shape description of a three dimensional object having one or more semantic segments and one or more annotations for each of the one or more semantic segments;
   receiving, into the non-volatile memory one or more training images of the object;
   identifying, through a processor, the one or more semantic segments in the one or more training images;
   computing, through a training module, one or more descriptors for the one or more identified semantic segments by determining at least one of a color and a texture of the one or more semantic segments; and
   generating an output file representing a machine vision of the three dimensional object based on the one or more descriptors for the one or more identified semantic segments computed through the training module.

2. The method of claim 1, wherein computing the one or more descriptors includes determining an area of interest of the one or more semantic segments.

3. The method of claim 1, further comprising: identifying stability of each semantic segment by analyzing a distribution of descriptors in each semantic segment.

4. The method of claim 3, wherein identifying stability of each semantic segment includes analyzing a distribution of the one or more descriptors in each of the one or more training images.

5. The method of claim 4, wherein analyzing the distribution of the one or more descriptors includes identifying whether a semantic segment includes one of a single stable appearance, multiple stable appearances, and no stable appearances.

6. The method of claim 5, wherein identifying whether the segment includes a single stable appearance includes determining a unimodal concentration distribution of descriptors meets a predetermined criteria.

7. The method of claim 5, wherein identifying whether the segment includes multiple stable appearances includes determining a multimodal concentration distribution of descriptors meets a predetermined criteria.

8. The method of claim 5, wherein identifying whether the segment includes no stable appearances includes determining a multimodal concentration distribution of descriptors fails to meet a predetermined criteria.

9. The method of claim 1, further comprising: identifying a three dimensional object with the output file including receiving one or more query images of the three dimensional object, identifying one or more semantic segments in the one or more query images based on the one or more descriptors in the output file, identifying one or more objects in the captured images as a spatial configuration of the one or more semantic segments, and generating an object identified signal.

10. The method of claim 9, wherein identifying one or more objects in the captured images as a spatial configuration of the one or more semantic segments includes identifying a semantic segment in the one or more query images that does not appear in the one or more training images.

11. The method of claim 1, further comprising:
detecting an area of instability including a change in material identified in the training image; and
determining if the area of instability is a known area of instability.

12. A system comprising:
a central processor unit (CPU);
a non-volatile memory operatively connected to the CPU; and
a training module configured to analyze an input file containing a geometric shape description of a three dimensional object having one or more semantic segments, and one or more annotations for each of the one or more semantic segments, the training module including computer readable program code embodied therewith, the computer readable program code, when executed by the CPU, causes the CPU to:
receive, into a non-volatile memory, an input file containing the geometric shape description of the three-dimensional object having the one or more semantic segments and the one or more annotations for each of the one or more semantic segments;
receive, into the non-volatile memory one or more training images of the three dimensional object;
identify, through a processor, the one or more segments in the one or more training images;
compute, through the training module, one or more descriptors to the identified one or more segments by determining at least one of a color and a texture of the one or more semantic segments; and
generate an output file representing a machine vision of the three dimensional object based on the one or more descriptors for the one or more identified semantic segments computed through the training module.

13. The system of claim 12, wherein the computer readable program code, when executed by the CPU, causes the CPU to: determine an area of interest of the one or more semantic segments when computing the one or more descriptors.

14. The system of claim 12, wherein the computer readable program code, when executed by the CPU, causes the CPU to: identify stability of each semantic segment by analyzing a distribution of descriptors in each semantic segment.

15. The system of claim 14, wherein the computer readable program code, when executed by the CPU, causes the CPU to: analyze a distribution of the one or more descriptors in each of the one or more training images when identifying stability of each semantic segment.

16. The system of claim 12, wherein the computer readable program code, when executed by the CPU, causes the CPU to: identify a three dimensional object with the output file including receiving one or more query images of the three dimensional object, identifying one or more semantic segments in the one or more query images based on the one or more descriptors in the output file, identifying one or more objects in the captured images as a spatial configuration of the one or more semantic segments, and generating an object identified signal.

17. The system of claim 16, wherein the computer readable program code, when executed by the CPU, causes the CPU to: identify a portion of a semantic segment in the one or more query images that does not appear in the one or more training images when identifying one or more objects in the captured images as a spatial configuration of the one or more semantic segments.

18. The system of claim 12, wherein the computer readable program code, when executed by the CPU, causes the CPU to:
detect an area of instability including a change in material identified in the training image; and
determine if the area of instability is a known area of instability.

19. A computer program product for analyzing an input file containing a geometric shape description of a three dimensional object having one or more semantic segments, and one or more annotations for the one or more semantic segments, the computer program product comprising a non-transitory computer readable storage medium having computer readable program code embodied therewith, the computer readable program code, when executed by a processor, causing the processor to:
receive, into a non-volatile memory, the input file containing the geometric shape description of the three dimensional object having the one or more semantic segments and the one or more annotations for each of the one or more semantic segments;
receive, into the non-volatile memory one or more training images of the three dimensional object;
identify, through a processor, the one or more segments in the one or more training images;
compute, through a training module, one or more descriptors to the identified one or more segments by determining at least one of a color and a texture of the one or more semantic segments; and
generate an output file representing a machine vision of the three dimensional object based on the one or more descriptors for the one or more identified semantic segments computed through the training module.

20. The computer program product of claim 19, wherein the computer readable program code, when executed by the processor, causes the processor to: determine an area of interest of the one or more semantic segments when computing the one or more descriptors.

21. The computer program product of claim 19, wherein the computer readable program code, when executed by the processor, causes the processor to: identify stability of each semantic segment by analyzing a distribution of descriptors in each semantic segment.

22. The computer program product of claim 19, wherein the computer readable program code, when executed by the processor, causes the processor to: identify a three dimensional object with the output file including receiving one or more query images of the three dimensional object, identifying one or more semantic segments in the one or more query images based on the one or more descriptors in the output file, identifying one or more objects in the captured images as a spatial configuration of the one or more semantic segments, and generating an object identified signal.

23. The computer program product of claim 19, wherein the computer readable program code, when executed by the processor, causes the processor to:
  detect an area of instability including a change in material identified in the training image; and
  determine if the area of instability is a known area of instability.

* * * * *